E. W. LANCASTER.
STALK CUTTER ATTACHMENT FOR PLOWS.
APPLICATION FILED MAR. 25, 1913.

1,090,400.

Patented Mar. 17, 1914.

2 SHEETS—SHEET 1.

WITNESSES:

INVENTOR
E. W. Lancaster.
BY
ATTORNEY

E. W. LANCASTER.
STALK CUTTER ATTACHMENT FOR PLOWS.
APPLICATION FILED MAR. 25, 1913.

1,090,400.

Patented Mar. 17, 1914.

WITNESSES:
J. C. Ledbetter
J. H. Murray

INVENTOR
E. W. Lancaster
BY John M. Spellman
ATTORNEY

UNITED STATES PATENT OFFICE.

EANESTER W. LANCASTER, OF OENAVILLE, TEXAS.

STALK-CUTTER ATTACHMENT FOR PLOWS.

1,090,400.  Specification of Letters Patent.  Patented Mar. 17, 1914.

Application filed March 25, 1913. Serial No. 756,675.

*To all whom it may concern:*

Be it known that I, EANESTER W. LANCASTER, a citizen of the United States, residing at Oenaville, in the county of Bell and State of Texas, have invented certain new and useful Improvements in Stalk-Cutter Attachments for Plows, of which the following is a specification.

My invention relates to a new and useful stalk cutting attachment for plows. Its object is to provide a stalk cutting wheel that may be mounted upon a plow in front of a plow share as a colter is ordinarily mounted, said wheel comprising a disk carrying a plurality of transverse blades and being adapted to rotate through contact with the ground during travel of the plow, passing over the stalks and cutting them into short pieces that will decay and disintegrate in a comparatively short time.

Another object of my invention is to provide a device for bending into the path of the cutting wheel all of the stalks over which the center portion of the plow passes.

A mechanism by which the cutting wheel may be elevated and held in various positions of adjustment constitutes a further feature of the invention.

Finally, the object of my invention is to provide a device of the character described that will be strong, durable, simple and efficient and comparatively easy to construct and also one the various parts of which will not be likely to get out of working order.

Figure 1:
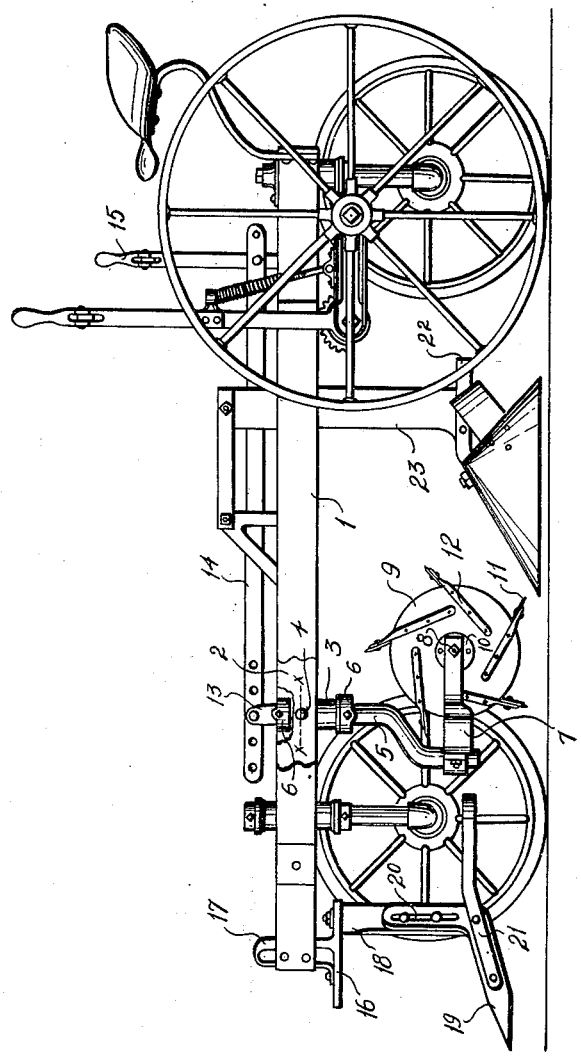
Figure 2:
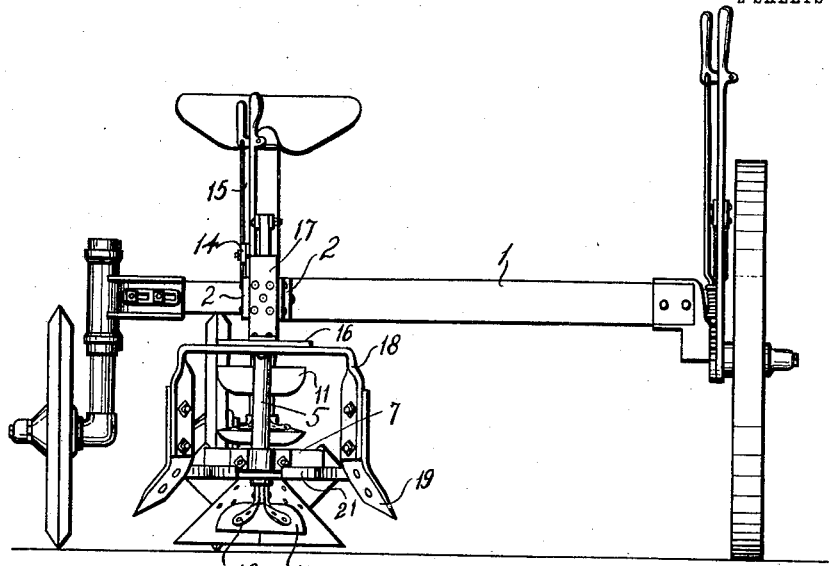
Figure 3:
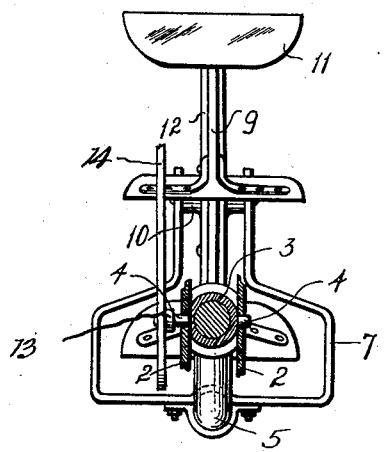
Figure 4:
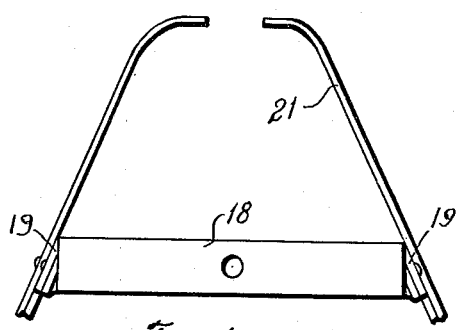

With these and various objects in view, my invention has relation to certain novel features of the construction and operation, an example of which is described in the following specification, and illustrated in the accompanying drawings, wherein:

Figure 1 is a view in side elevation of a plow with which is correlated the stalk cutting device constituting my invention. Fig. 2 is a front view of the same. Fig. 3 is a detail sectional view of the stalk cutting wheel showing the manner of mounting the same, the section being taken upon the line $x$—$x$ of Fig. 1. Fig. 4 is a detail top view of the means which I employ for guiding the stalks into the path of the cutting wheel.

Referring now more particularly to the drawings wherein like characters designate similar parts in all the figures, the numeral 1 denotes the frame of a plow which frame in this instance embodies a pair of parallel adjacent members 2 mounted longitudinally centrally of the plow. In the forward portion of the plow a substantially vertical sleeve 3 is mounted between the members 2, said sleeve being formed with a pair of opposite pivot pins 4 respectively passing through the members 2. An ordinary colter shank 5 has its upper extremity mounted in the sleeve 3, said shank being free to turn in said sleeve but being restricted from vertical displacement up or down by a pair of collars 6. The shank 5 is offset toward the front extremity of the plow between the sleeve 3 and the lower end of said shank. Upon the lower extremity of said colter shank there is clamped the forward end of a horizontal arched frame 7, the rearwardly extending sides of said frame being offset toward each other in their middle portion. Thus the rear end portions of the frame 7 lie in a considerably closer relation than the forward portions of the frame sides. The rear ends of the frame 7 furnish bearings for a short axle 8 upon which is centrally mounted a colter disk 9 held properly spaced from the two sides of the frame 7 by hub forming flanges 10 respectively secured to the sides of said disk. Upon the periphery of the disk 9, there is mounted a plurality of transverse hoe-shaped blades 11 secured to the disks by suitable bracket arms 12 and each inclined slightly from a radial relation to the disks. Upon one of the pins 4 there is rigidly mounted an upright arm 13 which has pivotal connection upon its upper extremity with a rearwardly extending bar 14. The bar 14 has pivotal connection at its rear end with the lower portion of a pivotally mounted upright lever 15, as is best shown in Fig. 1 in the drawings.

At the forward extremity of the plow there is mounted the usual buck head plates 16, the same being held in place by an arched member 17 clamped between the forward ends of the members 2. To the member 16 there is rigidly secured a transversely mounted arch member 18 having its parallel arms projecting downwardly and twisted to a slight divergence. To each vertical portion of the arch member 18 there is secured an angular member 19 comprising a vertical portion bolted to the correlated vertical portion of the arched member and a horizontally forwardly projecting portion, the two forwardly projecting portions being divergent and pointed at their extremities. In order that the angular member 19 may be adjusted at various heights with relation to the arched member, the former members are provided with vertical slots 20 receiving the bolts establishing connection between the two said members. To the forwardly projecting portions of the members 19, there are respectively secured the forward extremities of a pair of draw bars 21, which are curved toward each other and are spaced apart at their rear extremities. The members 21 will be preferably adjusted at the same height above the ground as the axis of the stalk cutting wheel previously described. The plow shaft which runs behind the stalk cutting wheel is designated in the drawings by the numeral 22, the same being mounted upon the foot of the usual standard 23.

I claim no novelty for the parts shown or described comprising an ordinary plow, my invention consisting entirely in the stalk cutting attachment to the plow and the means for guiding the stalks into the path of said attachment.

Since the colter shank is free to turn in the sleeve 3, said shank will turn in the sleeve at the ends of each row when the plow is being turned so that it may not drag or increase the draft while the plow is being turned.

It is apparent that when the lever 15 is rocked, a corresponding rocking motion will be communicated to the colter standard consequently throwing the colter wheel into a closer or a more remote relation to the ground. When the said lever is swung rearwardly from its vertical position, the stalk cutting wheel will be adjusted toward the ground and when the said lever is swung forwardly, the cutting wheel will be elevated.

The above described attachment for plows is of course not limited to any particular make of plow but is applicable to any plow in which provision is made for the use of a rolling colter.

My invention is especially adapted for use in middle breaking and the stalk cutting device is primarily intended for chopping cotton stalks.

The invention is presented as including all such modifications and changes as properly come within the scope of the following claims.

What I claim is:

1. In a device of the character described, the combination with a plow having the usual plow standard, of a sleeve mounted in the front portion of the frame adapted to pivot about an axis transverse of the frame, a colter standard having its upper portion rotatably mounted in said sleeve but restricted from vertical displacement relative thereto, the lower portion of said standard being forwardly offset, a stalk cutting wheel mounted upon the lower end of the colter standard in front of the plow standard and means for guiding stalks into the path of the said wheel.

2. In a device of the character described, the combination with a frame and a plow carried thereby, of a pivoted bearing hinged on the frame, a lever connected with one of the pivots of the bearing, a swinging support mounted to rotate in the bearing, a stalk cutting wheel carried by the support in front of the plow, and means for guiding stalks into the path of said wheel.

3. In a device of the character described, the combination with a frame and a plow carried thereby, of a pivoted bearing hinged on the frame, a lever connected with one of the pivots of the bearing, a swinging support mounted to rotate in the bearing, a bracket projecting rearwardly from the support, a disk mounted in the rear end of the bracket, and transverse cutting blades mounted on the disk.

4. In a device of the character described, the combination with a frame and a plow carried thereby, of a pivoted bearing hinged on the frame, a lever connected with one of the pivots of the bearing, a swinging support mounted to rotate in the bearing, a bracket projecting rearwardly from the support, a disk mounted in the rear end of the bracket, transverse cutting blades mounted on the disk, and a stalk guide depending from the frame in advance of the disk.

5. In a device of the character described, the combination with a frame, and a plow carried thereby, of a stalk cutting wheel having transverse cutters depending from the frame in advance of the plow and arranged to be swung in a vertical plane coincident to the vertical plane in which said wheel travels, and a lever mounted in the frame for swinging said wheel.

In testimony whereof I have signed my name to this specification in the presence of two subscribing witnesses.

EANESTER W. LANCASTER.

Witnesses:
SAML. P. SEVIER,
W. C. THOMSON.

Copies of this patent may be obtained for five cents each, by addressing the "Commissioner of Patents, Washington, D. C."